E. L. RENSTROM.
INSTRUMENT.
APPLICATION FILED DEC. 6, 1912. RENEWED APR. 2, 1915.
1,149,085.
Patented Aug. 3, 1915.
2 SHEETS—SHEET 1.
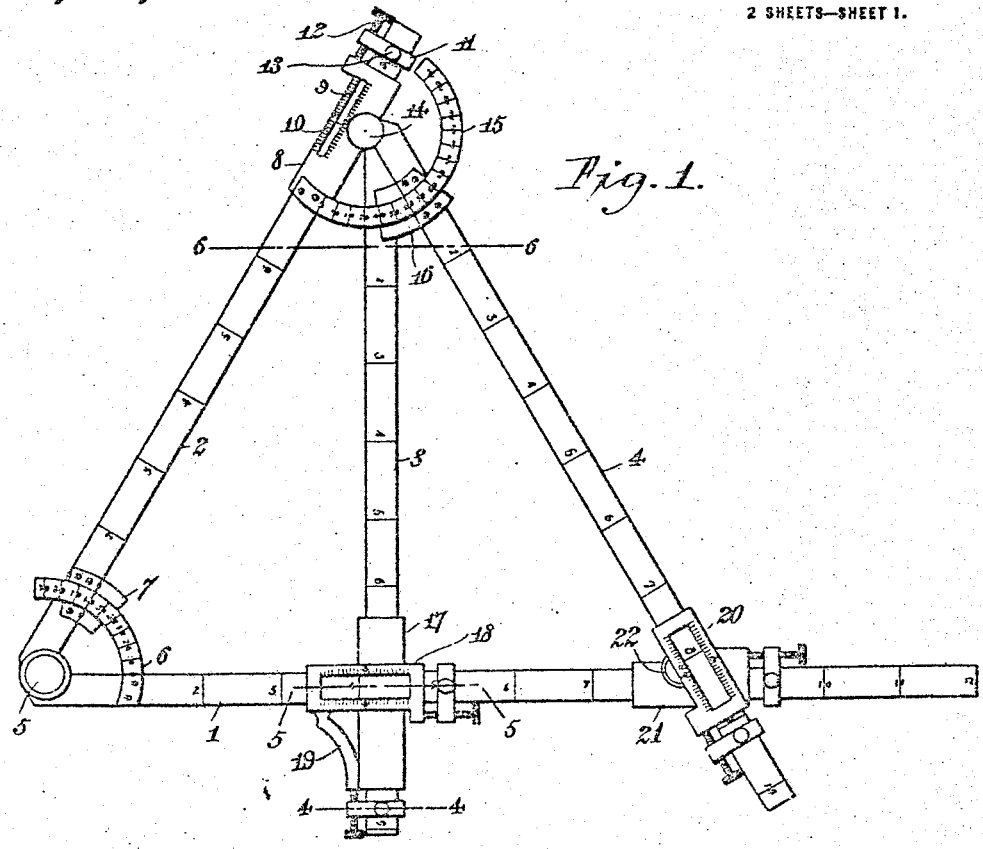
Fig. 1.
Fig. 3.
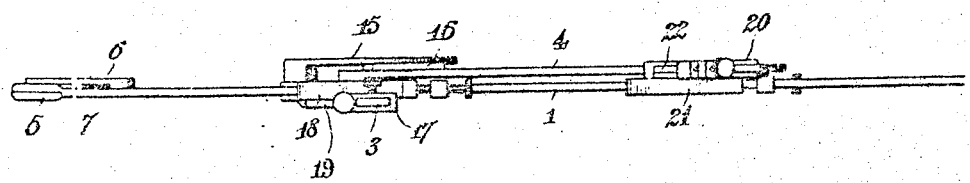
Inventor,
Edward L. Renstrom.
By Victor J. Evans,
Attorney

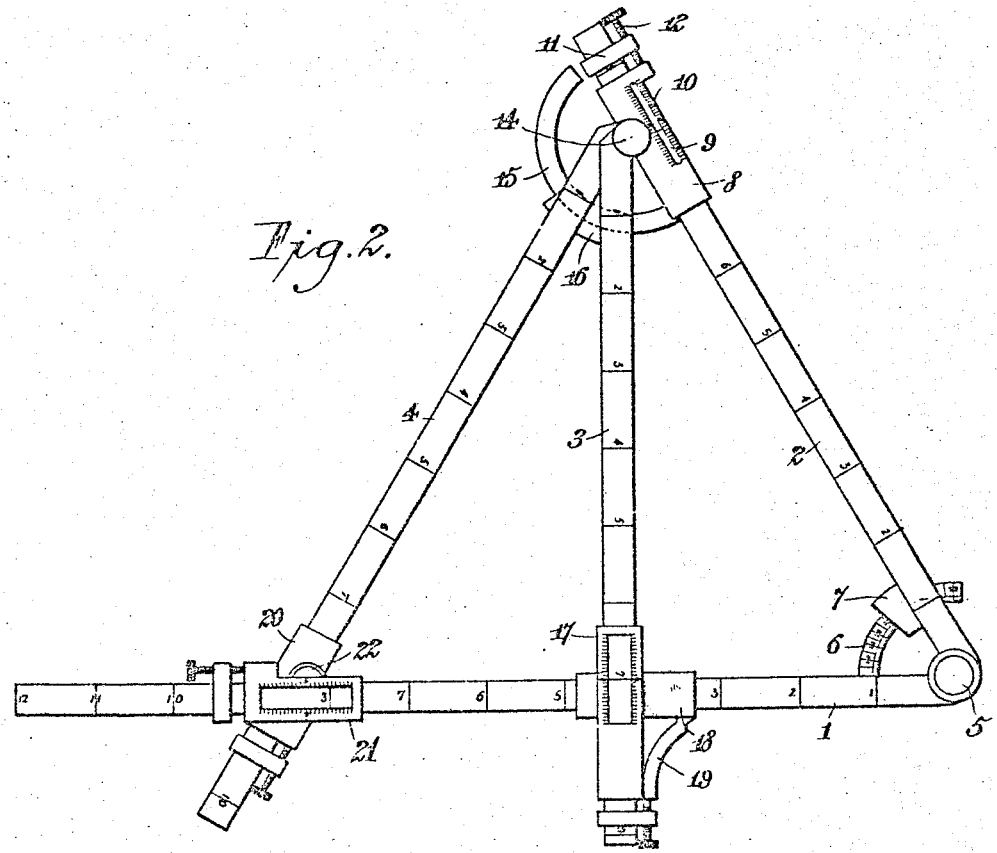

UNITED STATES PATENT OFFICE.

EDWARD L. RENSTROM, OF LEADVILLE, COLORADO.

INSTRUMENT.

1,149,085.  Specification of Letters Patent.  Patented Aug. 3, 1915.

Application filed December 6, 1912, Serial No. 735,302. Renewed April 2, 1915. Serial No. 18,341.

*To all whom it may concern:*

Be it known that I, EDWARD L. RENSTROM, a citizen of the United States, residing at Leadville, in the county of Lake and State of Colorado, have invented new and useful Improvements in Instruments, of which the following is a specification.

The invention relates to an instrument adapted particularly for engineers' use and designed to mechanically determine the unknown angles or linear dimension of a triangle by adjusting the instrument in accordance with the known dimensions.

The main object of the present invention is the provision of an instrument of the class described in the use of which the usual complicated mathematical computations are avoided and the unknown angle or linear dimensions mechanically determined by the instrument after adjustment, whereby the possibility of error and the time and labor required for the mathematical computations are eliminated.

The invention in the preferred form of details will be described in the following specification, reference being had particularly to the accompanying drawings, in which:—

Figure 1 is a plan of my instrument. Fig. 2 is a similar view taken from the opposite side. Fig. 3 is an edge view. Figs. 4, 5 and 6 are sections taken on the section lines indicated in Fig. 1.

Referring particularly to the accompanying drawings my instrument is made up of a plurality of bar-like sections 1, 2, 3 and 4, preferably of ruler-like formation and graduated to indicate feet, inches, or any other basic measurements. The sections 1 and 2 are pivotally connected at 5 to provide for the relative adjustment of these sections in any desired angular relation, and the section 1 preferably carries a protractor scale 6 while the section 2 carries an ordinary vernier scale 7 whereby the angular relation of the sections 1 and 2 may be accurately determined. Slidably mounted upon the section 2 is a sleeve-like member 8 formed with a longitudinally extending slot 9 through which the graduations of the section 2 may be read, the edges of the slot 9 being preferably graduated at 10 with minute graduations of the scale measurements indicated on the section 2. A band 11 is also slidably mounted upon the section 2 and is connected with the sleeve 8 by an adjusting screw 12, a clamping screw 13 passing through the band 11 and engaging the section 2. This provides a simple type of adjusting means, it being obvious that the sleeve 8 may be adjusted longitudinally of the section 2 to coincide generally with any particular scale mark on the section, and after fixing the sleeve with relation to the section 2 by means of the said screw 13 a completely accurate adjustment of the sleeve may be secured through the screw 12. This type of adjustment is well known in various instruments and no specific novelty is alleged herein for such device, it being understood that in operation any micrometer adjustment may be used as desired. A pivot member 14 is connected to the sleeve 8 and independently mounted on such pivot member are the terminals of sections 3 and 4 of the instrument. The sections 3 and 4 are preferably connected to the pivot member in superimposed relation longitudinally of said member, and the sleeve 8 carries a protractor scale 15 coöperating with a vernier 16 secured on the section 4, whereby accurate angular adjustment of the section 4 with relation to the section 2 is secured. The section 3 passes through an adjusting sleeve 17 similar in all respects to the sleeve 8, while the section 1 passes through a sleeve 18 similar to the sleeves 8 and 17, said sleeves 17 and 18 however, being through the medium of a web 19 connected in rigid relation, that is in exact right angular relation.

The sections 1 and 4 are slidably mounted in sleeves 20 and 21 respectively, which sleeves are similar to those previously described but are connected by a pivot connection 22.

It is of course understood that each sleeve member 6, 8, 17, 18, 20 and 21 has sliding coöperation with one section only and that in so far as said section is concerned, the particular sleeve carried thereby may be clamped thereto and subsequently adjusted with accuracy by the adjusting screw.

In the use of the instrument for example, it being desired to find the remaining angles and linear dimension of a triangle of which two sides and the included angle are known, the device is set by adjusting the sleeves 8 and 21 in accordance with the known dimensions of two sides of the triangle and clamping the sleeves in this adjustment. Then angularly adjusting the section 2 with relation to section 17 the given angle is indicated on the scale 6, the movement of the section 2 being secured by moving the section 4 through the sleeve 20 toward the sleeve 8. The precise adjustment is obtained by the use of the adjusting screw of the sleeve 20 as previously described. Now by adding the angular degrees indicated on the scales 6 and 15 between the sections 1 and 2 and 2 and 4 and subtracting the sum from 180° will give as a result the third angle, while the indicated length of the section 4 on the reading line of sleeve 20 will give the linear dimension of the third side. The protractor scale 6 is used when the included known angle is less than 90°, while the scale 15 is used when such angle is greater than 90°. When two known angles and the included side are given section 2, or rather the sleeve 8 thereon is adjusted to indicate the length of the known side. One of the known angles is then arranged on the scale 6 by adjustment of the section 4 as previously described having one of the known angles indicated on the scale 6 the sleeves 17 and 18 are clamped to respective beam sections 1 and 3 thereby fixing the angular relation of the sections 1 and 2. Section 4 is then adjusted longitudinally of section 1 until the scale 15 indicates the other known angle, and clamped in place. The sum of the angles between the sections 1 and 2 and between sections 2 and 4 subtracted from 180° will give the unknown angle while the linear dimension of sections 1 and 4 will give the unknown sides.

With three sides given the respective dimensions are adjusted on the sections 1, 2 and 4 and the angular relation of the respective sections determined in an obvious manner. With the use of section 3 the unknown linear dimension or dimensions of right angle triangles may be readily determined in an obvious manner.

In the use of the instrument mathematical computations ordinarily necessary to determine the unknown dimensions together with the time and labor required in such computation are avoided as the instrument will mechanically find the unknown dimension under all conditions where it is possible to determine such unknown dimensions mathematically from the known dimensions.

The respective beam sections 1, 2, 3, 4 may be constructed in any sectional area, of any length, or of any material, and no limitation is contemplated in this particular.

If desired the pivot member 15 may have a central transparent section in which appear the usual centering cross lines, enabling the sections 1 and 2 with the scale 6 to be used as an ordinary protractor.

The inside edge of each beam should pass exactly through the center of each joint to which they are connected, so as to give a perfect point of angle, or apex of angle, and the zeros of each graduated scale should be put directly above the center of each joint they are attached to. The rigid 90° angle should be put outside or under the main beam so as to give measurement to the most acute or obtuse angles. The perpendicular or center beam should be so made that it can be detached quickly, so that instrument can be folded and be put in a case specially made for it, which can be carried in the pocket.

What is claimed is:—

1. An instrument of the class described comprising two beams pivotally connected with relative angular movement, a sleeve slidably mounted on one of said beams, a plurality of beams pivotally connected to said sleeve, and sliding connections between the said latter beams and one of the first-mentioned beams.

2. An instrument of the class described comprising a main beam, a second beam pivotally connected to the main beam for angular adjustment and relation thereto, a sleeve slidably mounted on the second beam, a third and a fourth beam pivotally connected to the sleeve, independent sliding connections between said third and fourth beams and the main beam, said sliding connection between the fourth beam and the main beam maintaining a fixed angular relation between said beams.

3. An instrument of the class described comprising a main beam, a second beam pivotally connected to the main beam for angular adjustment and relation thereto, a sleeve slidably mounted on the second beam, a third and a fourth beam pivotally connected to the sleeve, independent sliding connections between said third and fourth beams and the main beam, said sliding connection between the fourth beam and the main beam maintaining a fixed angular relation between said beams, the sliding connections between the fourth beam and main beam being mounted for independent pivotal movement.

4. An instrument of the class described comprising a main beam, a second beam pivotally connected to the main beam for angular adjustment and relation thereto, a sleeve slidably mounted on the second beam, a third and a fourth beam pivotally connected to the sleeve, independent sliding connections between said third and fourth beams and the main beam, said sliding connection between the fourth beam and the main beam maintaining a fixed angular relation between said beams, the sliding connections between the fourth beam and main beam being mounted for independent pivotal movement, the protractor scale carried by the main beam to coöperate with the second beam.

5. An instrument of the class described comprising a main beam, a second beam pivotally connected to the main beam for angular adjustment and relation thereto, a sleeve slidably mounted on the second beam, a third and a fourth beam pivotally connected to the sleeve, independent sliding connections between said third and fourth beams and the main beam, said sliding connection between the fourth beam and the main beam maintaining a fixed angular relation between said beams, the sliding connections between the fourth beam and main beam being mounted for independent pivotal movement, the protractor scale carried by the main beam to coöperate with the second beam, and a protractor scale carried by the sleeve or second beam for coöperation with the fourth beam.

6. An instrument of the class described comprising a main beam, a second beam pivotally connected to the main beam for angular adjustment and relation thereto, a sleeve slidably mounted on the second beam, a third and a fourth beam pivotally connected to the sleeve, independent sliding connections between said third and fourth beams and the main beam, said sliding connection between the fourth beam and the main beam maintaining a fixed angular relation between said beams, the sliding connections between the fourth beam and main beam being mounted for independent pivotal movement, the protractor scale carried by the main beam to coöperate with the second beam, and a protractor scale carried by the sleeve or second beam for coöperation with the fourth beam, and means for clamping the sliding connections against independent sliding movement.

In testimony whereof I affix my signature in presence of two witnesses.

EDWARD L. RENSTROM.

Witnesses:
  BENJAMIN J. MAGNEE,
  JOHAN A. PETERSON.